United States Patent
Kim et al.

(10) Patent No.: US 9,156,090 B2
(45) Date of Patent: Oct. 13, 2015

(54) METHOD OF MANUFACTURING IRON-BASED POWDER

(75) Inventors: Ha Neul Kim, Busan (KR); Eon Sik Lee, Pohang-si (KR); Oh-Joon Kwan, Pohang-si (KR); Sun Jong Park, Daegu (KR); Hee Soo Kang, Daejeon (KR)

(73) Assignees: POSCO, Pohang-Si (KR); RESEARCH INSTITUTE OF INDUSTRIAL SCIENCE & TECHNOLOGY, Pohang-Si (KR)

(*) Notice: Subject to any disclaimer, the term of this patent is extended or adjusted under 35 U.S.C. 154(b) by 245 days.

(21) Appl. No.: 13/824,192

(22) PCT Filed: Sep. 15, 2011

(86) PCT No.: PCT/KR2011/006821
§ 371 (c)(1),
(2), (4) Date: Mar. 15, 2013

(87) PCT Pub. No.: WO2012/036488
PCT Pub. Date: Mar. 22, 2012

(65) Prior Publication Data
US 2013/0180360 A1    Jul. 18, 2013

(30) Foreign Application Priority Data

Sep. 15, 2010 (KR) .................. 10-2010-0090746
Sep. 15, 2011 (KR) .................. 10-2011-0093128

(51) Int. Cl.
*B22F 9/08* (2006.01)
*C21C 5/28* (2006.01)

(52) U.S. Cl.
CPC ......... *B22F 9/082* (2013.01); *B22F 2009/0828* (2013.01); *B22F 2009/0888* (2013.01); *C21C 5/28* (2013.01)

(58) Field of Classification Search
None
See application file for complete search history.

(56) References Cited

U.S. PATENT DOCUMENTS

| | | | |
|---|---|---|---|
| 2,238,382 A | 4/1941 | Boegehold | |
| 3,502,446 A | 3/1970 | Ayers | |
| 3,528,081 A | 9/1970 | Huseby et al. | |
| 3,725,142 A * | 4/1973 | Huseby | 419/29 |
| 3,887,402 A * | 6/1975 | Kondo et al. | 148/513 |
| 3,966,454 A * | 6/1976 | Ito et al. | 75/345 |
| 5,571,305 A | 11/1996 | Uenosono et al. | |
| 6,336,953 B1 | 1/2002 | Kikukawa et al. | |
| 6,342,087 B1 | 1/2002 | Arvidsson et al. | |

FOREIGN PATENT DOCUMENTS

| | | |
|---|---|---|
| CN | 1410208 | 4/2003 |
| CN | 101413082 | 4/2009 |

(Continued)

OTHER PUBLICATIONS

Lecture on Modern Metal: Refining 1. Steelmaking, written by The Japan Institute of Metals and Materials, translated by Yoon, Dong Seok et al., 1989.

*Primary Examiner* — George Wyszomierski
(74) *Attorney, Agent, or Firm* — The Webb Law Firm

(57) ABSTRACT

A method of manufacturing iron-based powder includes providing an iron-based molten steel manufactured through a iron making process and a steelmaking process to a tundish; and performing water atomization over the molten steel discharged through a nozzle connected to the tundish. The iron-based powder is manufactured from the molten steel refined after a molten iron tapped from a iron making process is charged into a converter without a pre-treatment process of the molten iron, thus economically providing the highly clean iron-based powder.

7 Claims, 2 Drawing Sheets

(56) References Cited

FOREIGN PATENT DOCUMENTS

| | | |
|---|---|---|
| DE | 102008064190 A1 | 7/2010 |
| FR | 1436176 A | 4/1965 |
| JP | 04-083813 A | 3/1992 |
| KR | 19970002097 B1 | 2/1997 |
| KR | 1019970002097 B1 | 2/1997 |
| KR | 10037226 B1 | 1/2003 |
| KR | 100548213 B1 | 1/2006 |
| KR | 1020070087463 | 8/2007 |
| KR | 100819534 B1 | 3/2008 |
| WO | 9858093 A1 | 12/1998 |

* cited by examiner

METHOD OF MANUFACTURING IRON-BASED POWDER

TECHNICAL FIELD

The present invention relates to a method of manufacturing iron-based powder, and more particularly, to a method of manufacturing iron-based powder using a molten steel obtained through an iron making process and a steelmaking process.

BACKGROUND ART

In accordance with the recent development of the industry of parts for sintering, which have a complicated shape required in vehicles and machineries, a use amount of iron-based powder used as a raw material thereof is rapidly increased.

The parts for sintering are subjected to a process of filling the iron-based powder that is the raw material in a mold having a shape of a product manufactured to be fit for the purpose, applying a high pressure of 4 to 7 ton/cm² to perform compressing and forming, and performing sintering treatment at high temperatures in order to provide physical and mechanical characteristics to obtain a sintered body having a high density.

Particularly, in order to manufacture sintered parts for vehicles, the powder itself should have excellent qualities such as appropriate grain size, flowability, apparent density, green density, and high cleanness so as to manufacture a high density sintered body.

It is known that since iron powder manufactured through a water atomization process does not cause a phenomenon where pores remain in a vacancy formed by reduction of oxides in the powder during a reduction process unlike reduced iron, internal pores hardly exist therein, and thus when the same pressure is applied, the iron has a green density having a high value of 0.5 g/cm³ or more as compared to the reduced iron and thus is suitable for manufacturing high density sintered parts.

Further, when the iron-based powder is manufactured, it is very important to maintain high cleanness of the iron-based powder through minimization of impurities, such as carbon (C), oxygen (O), nitrogen (N), sulfur (S), and phosphorus (P), which negatively affect compressibility.

Another important factor required in the iron-based powder together with excellent qualities such as high cleanness and high green density is economic feasibility of a manufacturing process.

In the conventional art, after scrap iron was re-melted in an arc electric furnace and subjected to a refining process including oxygen blowing such as decarburization and dephosphorization to form molten steel, iron-based powder was manufactured by a water atomization process.

However, in the conventional art, since scrap irons having different impurity contents were reused, a lot of time and costs were used to constantly maintain components of the molten steel.

Further, in general, since surface tension of the molten steel subjected to water atomization is high, there is a problem in that when the molten steel is powderized during the water atomization process, since a shape of the powder tends to become spherical, green strength of a formed material is reduced when the powder is compressed, and thus the formed material is undesirably damaged during transportation.

The above information disclosed in this Background section is only for enhancement of understanding of the background of the invention and therefore it may contain information that does not form the prior art that is already known in this country to a person of ordinary skill in the art.

The present invention has been made in an effort to provide a method of manufacturing iron-based powder by providing an iron-based molten steel manufactured through an iron making process and a steelmaking process to a tundish, and performing water atomization over the molten steel discharged through a nozzle connected to the tundish.

SUMMARY OF THE INVENTION

An exemplary embodiment of the present invention provides a method of manufacturing iron-based powder including: providing an iron-based molten steel manufactured through an iron making process and a steelmaking process to a tundish, and performing water atomizing the molten steel discharged through a nozzle connected to the tundish.

In the steelmaking process, a molten iron tapped from the iron making process may be charged into a converter to be refined without pre-treatment of the molten iron.

A temperature range of the molten iron before being charged into the converter may be 1,250° C. to 1,450° C., and a content of sulfur (S) may be 0.005 wt % to 0.1 wt %.

The method of manufacturing the iron-based powder may further include adding a sulfur-containing material to the molten steel so that a content of sulfur (S) included in the molten steel before provided to the tundish is 0.1 wt % to 0.2 wt %.

In the molten steel refined by the steelmaking process, a content of carbon (C) may be 0.001 wt % to 0.1 wt %, and a content of phosphorus (P) may be 0.001 wt % to 0.02 wt %.

The method of manufacturing the iron-based powder may further include performing dehydration, drying, and reduction heat treatment over the iron-based powder manufactured by the water atomization.

The reduction heat treatment may be performed by reacting the iron-based powder, which is separated from a large amount of water by the water atomization and cooled, under a reduction atmosphere of 600° C. to 1,200° C.

In the case where an average content of sulfur (S) of the iron-based powder is more than 0.01 wt % after the reduction heat treatment, the reduction heat treatment may be repeatedly performed.

As described above, according to a method of manufacturing iron-based powder by the present invention, there are the following effects.

In the present invention, it is possible to provide powder having excellent qualities and reduce a manufacturing cost by performing steelmaking treatment over molten iron in a liquid phase to directly manufacture iron-based powder unlike re-melting of scraps. Thereby, the present invention can largely contribute to improving technological and cost competitiveness of the industry of vehicle and machinery-relating parts using the iron-based powder. Further, energy saving required to re-melt the scraps is feasible, thus reducing $CO_2$ discharge.

In addition, it is possible to increase forming strength of the iron-based powder powderized by the water atomization process by manufacturing the powder from the molten steel obtained by refining the molten iron containing sulfur in a predetermined amount in a steelmaking process.

DETAILED DESCRIPTION OF THE INVENTION

Figure 1:
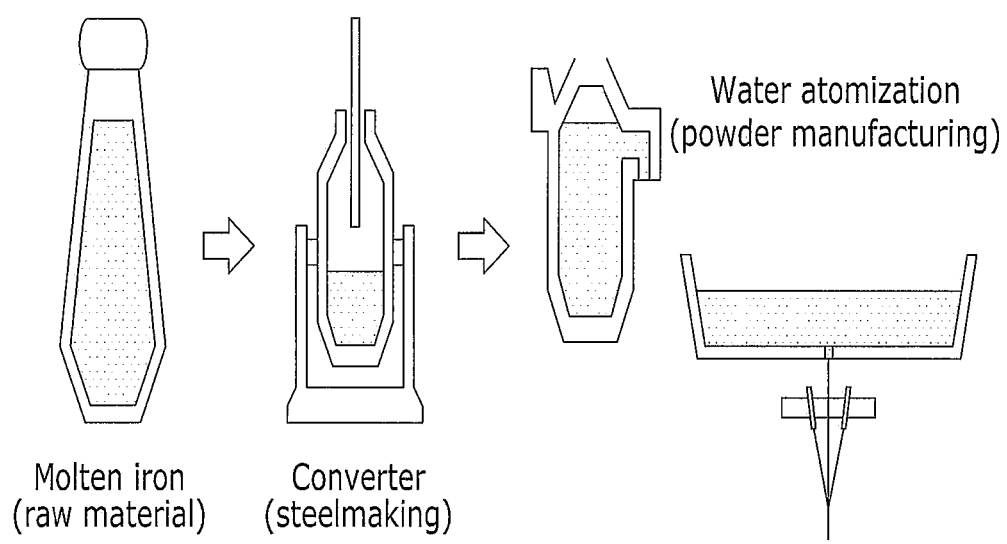
FIG. 1 is a view illustrating a process of a method of manufacturing iron-based powder using a molten steel according to an exemplary embodiment of the present invention.

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments are provided by way of example only so that the disclosure of the present invention is fully understood and a person of ordinary skill in the art can fully understand the scope of the present invention. Therefore, the present invention will be defined only by the scope of the appended claims. Like reference numerals designate like elements throughout the specification.

Hereinafter, a method of manufacturing iron-based powder using a molten steel according to a preferable exemplary embodiment of the present invention will be described with reference to the accompanying drawings. For reference, in the description of the present invention, in the case where it is deemed that a detailed description of related known functions or constitutions may unnecessarily cloud the gist of the present invention, the detailed description thereof will be omitted.

FIG. 1 is a process view schematically illustrating a process of manufacturing iron-based powder using a molten steel according to an exemplary embodiment of the present invention.

As illustrated in FIG. 1, the method of manufacturing the iron-based powder according to the preferable exemplary embodiment of the present invention includes providing an iron-based molten steel manufactured through a iron making process and a steelmaking process to a tundish, and performing water atomization over the molten steel discharged through a nozzle connected to the tundish.

The present invention is characterized in that molten iron manufactured in the iron making process is used as a raw material for manufacturing the iron-based powder. The iron making process includes a blast furnace process, which is a general iron making process, or a FINEX smelting reduction process, and the molten iron is tapped in the range of 1,500 to 1,600° C., put into a molten iron carrying vehicle, and charged into a converter.

Main components of the tapped molten iron may be carbon (C) of 4 wt % or more, silicon (Si) of 0.1 to 1 wt %, manganese (Mn) of 0.1 to 0.5 wt %, phosphorus (P) of 0.06 to 0.2 wt %, sulfur (S) of 0.005 to 0.1 wt %, chrome (Cr) of 0.1 wt % or less, titanium (Ti) of 0.1 wt % or less, vanadium (V) of 0.1 wt % or less, and copper (Cu) of 0.01% or less.

The molten iron having the sulfur (S) component of 0.005 to 0.1 wt % is charged into the converter in the range of 1250° C. to 1450° C.

Unlike the invention of the present application, in a general continuous casting process of manufacturing a slab and the like, before the molten iron is charged into the converter, the molten iron is added to a ladle to control the content of sulfur to 0.005 wt % or less by a pre-treatment process of the molten iron (e.g., desulfurization treatment), this process is performed for about 45 minutes, and a temperature of the molten iron is reduced to 50° C. at maximum.

The desulfurization treatment means a process of adding a quicklime and the like to the molten iron charged into the ladle, and then performing agitation to remove the sulfur component included in the molten iron.

The steelmaking process means a process of refining impurities such as carbon, silicon, manganese, phosphorus, and sulfur included in the molten iron tapped by the iron making process to reduce the content of carbon and remove the impurities, and the converter and the like may be used.

The invention of the present application does not require a pre-treatment process of the molten iron, which is performed in a general steelmaking process. That is, since sulfur contained in the molten iron does not need to be removed during the pre-treatment process, the aforementioned reduction in temperature may be prevented and a process time may be shortened.

A process of removing sulfur may be performed in the converter of the steelmaking process in addition to the pre-treatment process of the molten iron.

Sulfur serves to allow the powder to have an irregular non-spherical shape by reducing surface tension of the molten steel when the molten steel is powderized in a water atomization process as described below.

Subsequently, the method of manufacturing the iron-based powder may further include adding a sulfur-containing material to the molten steel so that the content of sulfur (S) included in the molten steel before provided to the tundish is 0.1 wt % to 0.2 wt %.

Green strength of a formed material may be increased when water atomization as described below is performed, that is, when the powder is compressed and formed so that the shape of the powder manufactured by a process of injecting high-pressure water to the falling molten steel is not spherical but irregular, by adding a material increasing the content of sulfur in the molten steel to reduce viscosity of the molten steel (increase flowability of the molten steel).

An alloy iron containing sulfur, such as ferro sulfur (FeS) may be used as the material that can increase the content of sulfur, and the alloy iron may be added to the ladle before the refined molten steel is contained in ladle to be provided to the tundish.

In the steelmaking process, the molten iron tapped in the iron making process is refined to the molten steel having carbon (C) in the range of 0.001 to 0.1 wt % and phosphorus (P) in the range of 0.001 wt % to 0.02 wt % among the contained components through an oxidation reaction for 30 to 60 mins in the converter.

In this case, the reason why the content of carbon among the components of the molten steel is maintained to be 0.001 to 0.1 wt % is that when the molten steel is subjected to the water atomization to be powderized, if the content of carbon (C) is less than 0.001 wt %, a FeO oxidation layer is formed in a thickness of about 5 to 15 μm on a surface of the powder immediately after the water atomization, and thus a required time and a consumption amount of reduction gas are increased during a subsequent reduction heat treatment process to reduce productivity and increase a manufacturing cost.

Meanwhile, if the content of carbon (C) is more than 0.1 wt %, even though the reduction heat treatment process is performed, since carbon in the powder is not completely removed, carbide is formed, so that formability of the powder deteriorates due to an increase in hardness value of the powder.

Meanwhile, the reason why the content of phosphorus (P) among the components of the molten steel is maintained to be 0.001 to 0.02 wt % is that a time of an oxidation reaction is further required due to a double-slag method used in order to reduce the content of the phosphorus component to the level of 0.001 wt %, and thus a converter process time is lengthened, and if the content is more than 0.02 wt %, brittleness occurs in a final product, and thus there is a drawback in that a life-span of the product deteriorates.

The molten steel subjected to the oxidation reaction in the converter is tapped into the ladle at the temperature in the range of 1550° C. to 1750° C., the molten steel at the temperature in the range of 1530° C. to 1700° C. in the ladle is tapped into the tundish at a lower portion of the ladle at a discharge speed of 100 kg/min to 3 ton/min, and the molten steel is allowed to fall through a circular ceramic orifice (nozzle) positioned at the lower portion of the tundish and having an interior diameter of 10 mm to 40 mm into a water atomization process chamber at the lower portion.

If the temperature of the molten steel in the ladle is less than 1530° C., the molten steel is solidified, and thus the process cannot be performed any more, and if the temperature is more than 1700° C., an overload is applied to ladle refractories and tundish refractories, and thus an operation may become very dangerous.

If the discharge speed of the molten steel is lower than 100 kg/min, productivity is reduced, which is a factor of increasing a cost, and it is very difficult to treat the molten steel of 10 tons or more, and if the discharge speed of the molten steel is higher than 3 ton/min, since the total amount of water required for water atomization and cooling needs to be great, a scale of an entire device is exponentially increased to excessively increase an investment cost.

Figure 2:
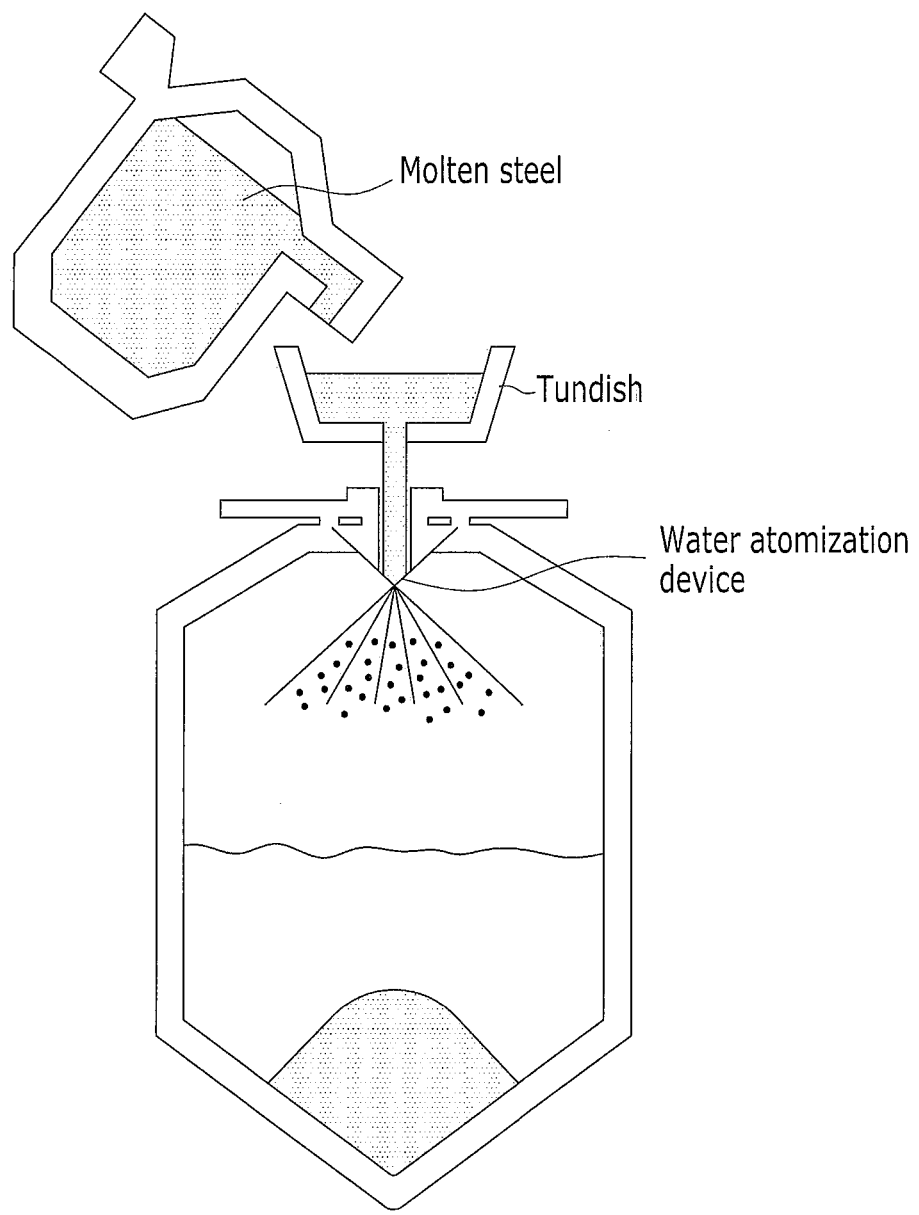
FIG. 2 is a view illustrating a process of performing water atomization over the molten steel discharged from a nozzle connected to a tundish.

FIG. 2 is a view schematically illustrating a process of manufacturing the iron-based powder by injecting high-pressure water to the iron-based molten steel discharged through the nozzle connected to the tundish.

The water atomization may adopt a device used in a method of manufacturing iron-based powder in the conventional art.

The molten steel inflowing through the ceramic orifice (nozzle) into the water atomization process chamber is separated into liquid drops having the size of 500 μm or less due to collision with water injected at a pressure of 50 to 300 bar through the nozzle positioned at an upper portion of the chamber to inject high-pressure water therethrough, and the liquid drops are quenched by cooling water filled about 20 to 80% in the chamber and by the injected water and powderized such that the ratio of particle size of 150 μm (100 mesh) or less is at a level of 80 to 95%.

In this case, since water and iron come into direct contact with each other at high temperatures, the surface is covered with the oxidation layer.

If the pressure of high-pressure water is lower than 50 bar, surface roughness of the powder is reduced, and the powder of 150 μm or less cannot be obtained at a ratio of 80% or more, and if the pressure is 300 bar or more, since an average grain size of the powder is reduced, the powder having the size in the desired range (powder of 100 mesh or less at a ratio of 80% or more and 95% or less) cannot be obtained, and thus a yield is reduced.

The powder is separated from process water and cooling water in the chamber, dried via dehydration treatment and drying treatment so that the water content is 0.1 wt %, and subjected to heat treatment at the temperature of 600 to 1,200° C. while blowing reduction gas including hydrogen to have the oxygen content of 0.2 wt % or less.

The average content of sulfur (S) of the iron-based powder is managed to be 0.01 wt % or less by the reduction heat treatment. In the case where the average content of sulfur of the iron-based powder is more than 0.01 wt % by the reduction heat treatment, the reduction heat treatment is repeatedly performed. Thereafter, the powder is subjected to a pulverization process, a classification process, and a mixing process to be controlled so that the average size is 50 to 100 μm, the ratio of the size of 45 μm or less is 40% or less, and the ratio of the size of 150 μm or less is 80 to 95%.

Only when the ratio of 100 mesh or less is 80 to 95% in the grain size distribution of the powder immediately after the water atomization process, the amount of the powder lost during a subsequent process may be minimized to increase the yield of the powder.

If the ratio is 80% or less, since the ratio of the powder of more than 100 mesh is more than 20% to reduce the yield of the powder to be less than 80%, an unnecessary operation such as scrap treatment of the large powder should be performed, which is not preferable, and if the yield of the powder is increased to be 95% or more, since the average grain size is reduced to the level of 50 μm and the ratio of the powder of 325 mesh or less is more than 40%, so that flowability of the powder deteriorates (30 sec/50 g or more), and thus the charge speed of the powder in a mold is reduced during a forming process to reduce productivity and a density non-uniform region is formed in a formed material due to deterioration of flowability.

Further, a required forming pressure to the formed materials having the same density is increased, and thus a high pressure is repeatedly applied to the mold to reduce a life-span of the mold.

Hereinafter, the method of manufacturing the iron-based powder using the molten steel according to the present invention will be described in detail through the Examples. However, the following Examples are set forth to illustrate the present invention but are not to limit the present invention.

Example 1

After the molten iron manufactured in the blast furnace was subjected to steelmaking treatment in the converter without performing pre-treatment of the molten iron, the molten steel was transported to the tundish, and the iron-based powder was manufactured by using the high-pressure water atomization device.

The molten steel was a matter obtained by controlling the component of the molten iron having the high carbon content manufactured through the iron making process, and the oxidation refining process was applied in the converter as a process for controlling the component in a molten steel state.

The iron-based powder using the iron-based molten steel according to the present invention and scrap iron in the conventional art were re-melted in the arc furnace to manufacture the iron-based powders in order to specifically calculate a cost reduction effect that can be generated by applying the present invention.

The molten steel was obtained by adding the molten iron manufactured in the blast furnace to the converter to oxidize and refine components such as carbon, silicon, and phosphorus in the converter, charged into the tundish, and fell down through the nozzle to manufacture the iron-based powder by using the high-pressure water atomization device, and costs for each process thereof and the total cost were calculated, and are described in Table 1.

Further, after the scrap iron was re-melted, the iron-based powder was manufactured through the high-pressure water atomization process by using the molten steel obtained through the steelmaking process in the electric furnace, and costs for each process and the total cost are described as comparison data in Table 1.

Substantially, when the case where the molten steel proposed by the present invention is directly used as an original material is compared to a re-melting process of scrap iron in the conventional art, it is expected that there is a very large effect of reduction in additional cost such as a time required during a continuous cast process and a re-melting process and additionally consumed energy during vacuum deaeration treatment.

TABLE 1

| Factors of costs | Raw material | Melting and steelmaking | Manu-facturing of powder | Total |
|---|---|---|---|---|
| Process in the conventional art | Low-hydro-carbon clean scrap iron | Electric furnace steelmaking | 36 thousand wons/ton | Water atomization and post-treatment | 5.36 hundred thousand wons/ton |
| Cost | 4.5 hundred thousand wons/ton | | 36 thousand wons/ton | 50 thousand wons/ton | |
| Example of the present invention | Molten iron | Converter | 24 thousand wons/ton | water atomization and post-treatment | 3.74 hundred thousand wons/ton |
| Cost | 3.0 hundred thousand wons/ton | | 24 thousand wons/ton | 50 thousand wons/ton | |

As described in Table 1, in the case where the iron-based powder of 1 ton was manufactured by using the molten steel according to the present invention, an effect of reduction in cost of about 1.62 hundred thousand wons/ton can be expected as compared to a process in the conventional art.

Further, since the molten steel is directly used, cooling and re-melting processes are omitted, and thus it is possible to control even various problems such as oxides and carbides inflowing from each process, segregation, and heterogeneous compositions, accordingly, it is expected that there is a large effect in quality and high cleanness of the iron-based powder.

Further, the high cleanness effect in which impurities were suppressed by a direct use of the molten steel of the iron-based powder manufactured by applying the present invention was compared to that of commercial iron-based powder manufactured by using the process in the conventional art.

Items of carbon, oxygen, nitrogen, sulfur, phosphorus, silicon, and the like largely affecting formability were preponderantly analyzed as impurity items for comparison and analysis, and compared to those of the iron-based powder manufactured by using the process in the conventional art (Comparative Examples 1, 2, and 3).

TABLE 2

| Classification | Carbon (wt %) | Oxygen (wt %) | Nitrogen (wt %) | Sulfur (wt %) | Phosphorus (wt %) | Silicon (wt %) |
|---|---|---|---|---|---|---|
| Comparative Example 1 | 0.001 | 0.094 | 0.0097 | 0.0065 | 0.0055 | 0.0088 |
| Comparative Example 2 | 0.002 | 0.16 | 0.008 | 0.0033 | 0.011 | 0.019 |
| Comparative Example 3 | 0.0016 | 0.15 | 0.0067 | 0.0065 | 0.0058 | 0.024 |
| Example 1 | 0.001 | 0.1 | 0.006 | 0.003 | 0.005 | 0.008 |

As described in Table 2, it can be seen that in the case where the iron-based powder (Example 1) is manufactured by using the molten steel according to the present invention, the high cleanness iron-based powder containing any impurity components in an amount corresponding to a minimum level or less is obtained as compared to a content of the impurity components of the powders (Comparative Examples 1, 2, and 3) manufactured by the process in the conventional art.

Particularly, in the case of the example of the present invention, the content of gas impurities such as carbon, oxygen, and nitrogen known as matters largely affecting formability is at a minimum level of the powder in the conventional art, and thus it is expected that there is a large effect in manufacturing high density sintered parts.

In order to verify the effect, the powder in the conventional art and the iron-based powder according to the present invention were mixed with the lubricant, and compression formability was evaluated by using the cylindrical mold. The formability was evaluated under pressure of 600 MPa three times or more, and the formabilities between the powders were compared by measuring the density of the formed material.

TABLE 3

| Classification | Formed material 1 | Formed material 2 | Formed material 3 | Average |
|---|---|---|---|---|
| Comparative Example 1 | 7.06 | 7.05 | 7.08 | 7.06 ± 0.02 |
| Comparative Example 2 | 6.98 | 7.00 | 6.97 | 6.98 ± 0.02 |
| Comparative Example 3 | 7.01 | 6.95 | 7.00 | 6.99 ± 0.03 |
| Example 1 | 7.11 | 7.15 | 7.10 | 7.12 ± 0.03 |

As described in Table 3, it can be seen that the density of the iron-based powder formed material manufactured from the present invention is higher than the density of the powder formed material manufactured in the conventional art by 0.06 to 0.14 $g/cm^3$, which exhibits excellent formability.

Since a shrinkage ratio is low when parts for sintering are manufactured by using the powder having excellent formability, an inferiority rate and internal porosity can be reduced, and thus an effect in which parts having high toughness and a long life-span can be manufactured can be expected.

Example 2

Five specimens were manufactured in order to specifically calculate improving effects in quality of iron-based powder occurring by applying the present invention. The five specimens are as follows.

First, the molten steel was obtained through the steelmaking process in the converter while the molten iron manufactured in the blast furnace was not subjected to desulfurization treatment, and then tapped into the ladle at the target temperature, high-pressure water was injected to the molten steel falling down through the orifice at the lower portion of the tundish to manufacture the iron-based powder, and reduction heat treatment was performed over the powder subjected to dehydration and drying processes. (Example 2, 0.05 wt % of sulfur in the molten steel)

Second, after the molten steel was obtained through the steelmaking process in the converter while the molten iron manufactured in the blast furnace was not subjected to desulfurization treatment, alloy iron including the sulfur component was put, high-pressure water was injected to obtain the powder, and the powder was subjected to the same post-process. (Example 3, 0.2 wt % of sulfur in the molten steel)

Third, desulfurization treatment was further performed with respect to Example 2. (Example 4)

Fourth, desulfurization treatment was further performed with respect to Example 3. (Example 5)

Fifth, for the purpose of utilization as the Comparative Example, the sorted scraps were re-melted in the arc electric furnace and tapped into the ladle, and the molten steel falling down through the orifice at the lower portion of the tundish was subjected to high-pressure water atomization, dehydration, drying, and reduction heat treatment processes to manufacture iron-based powder. (Comparative Example 2, 0.01 wt % of sulfur in the molten steel)

Components of the iron-based powder of the five samples are described in the following Table 4. It can be seen that since the molten steel is manufactured so that all components of the five samples are similar, all have the similar component values, but in the case of Example 3, since the alloy iron containing sulfur is added to the molten steel, the content of the sulfur component is slightly higher than those of other powders.

Further, in the case of Comparative Example 2, since the sulfur component was not separately added to the molten steel, the content of the sulfur component was lowest in the powder.

TABLE 4

| Classification | Carbon (wt %) | Oxygen (wt %) | Nitrogen (wt %) | Sulfur (wt %) | Phosphorus (wt %) | Silicon (wt %) |
|---|---|---|---|---|---|---|
| Example 2 | 0.002 | 0.147 | 0.0067 | 0.0065 | 0.0084 | 0.0078 |
| Example 3 | 0.002 | 0.150 | 0.0070 | 0.0110 | 0.0091 | 0.0083 |
| Example 4 | 0.002 | 0.151 | 0.0062 | 0.0035 | 0.0087 | 0.0085 |
| Example 5 | 0.002 | 0.150 | 0.0067 | 0.0058 | 0.0082 | 0.0079 |
| Comparative Example 2 | 0.002 | 0.146 | 0.0068 | 0.0015 | 0.0090 | 0.0079 |

Apparent density, flowability, green density (at 600 MPa), and green strength (at 7.1 g/cm3) of the five iron-based powders, which were generally considered as criteria of evaluating powder characteristics, were evaluated, and are described in Table 2.

The apparent density was highest in Comparative Example 2, and it is judged that this is because the content of sulfur in the molten steel is low, and thus the shape of the powder is close to a sphere as compared to four other samples. The flowability was lowest in Comparative Example 2 based on the same reason.

All the forming densities were similar when pressure of 600 MPa was applied, but the green strength was lowest in Comparative Example 2, and it is judged that this is because the shape of the powder is close to a sphere, and thus bonding force between powders is poor.

The green strength value was high in Examples 3 and 5 where the sulfur component was added to the molten steel, and it is judged that this is because viscosity of the molten steel is reduced due to addition of sulfur, and thus the powder has a particle shape that is more irregular than those of two powders.

In general, it can be seen that since the green strength is 30 to 40 MPa in the case of commercial powder, in the case of Examples 2 to 5 that are the examples of the present invention among the five present samples, the green strength has a value that is similar to or higher than a level of the commercial powder, and Comparative Example 2 has a very low value.

TABLE 5

| Classification | Apparent density (g/cm3) | Flowability (sec/50 g) | Green density (g/cm3) | Green strength (MPa) |
|---|---|---|---|---|
| Example 2 | 3.01 | 27.8 | 7.02 | 36 |
| Example 3 | 2.97 | 28.9 | 7.01 | 43 |
| Example 4 | 3.00 | 26.7 | 7.03 | 35 |
| Example 5 | 2.99 | 27.9 | 7.05 | 41 |
| Comparative Example 2 | 3.15 | 25.3 | 7.10 | 18 |

As described in Table 5, it can be seen that the green strength of the iron-based powder formed material manufactured from the molten iron according to the present invention has a value that is higher than the strength of the powder formed material manufactured by re-melting of the scraps by two times or more.

When the powder is manufactured under the same powder manufacturing condition (water atomization process and reduction process), in the case where the molten steel is obtained by re-melting the scraps, if the content of the sulfur component is low, the green strength may be reduced to cause breakage when the formed material is transported.

Accordingly, it can be seen that the sulfur component should be added to melting in order to obtain the iron-based powder having the high green strength when the scraps are re-melted, which becomes a factor of increasing a process cost.

On the other hand, if 0.05 wt % of the sulfur component contained in the molten iron is not separately removed but applied to the water atomization process, even though the sulfur component is not separately added, green strength and general physical properties corresponding to those of the commercial powder may be obtained.

In the case of the conventional art, when the iron-based powder is manufactured, if the molten steel is used by re-melting scrap iron (magnetic scrap iron) generated through a continuous cast process or general scrap iron in an arc melting furnace or the like, oxygen, nitrogen, and the like in the atmosphere may inflow in the course of melting, impurities such as slag may need to be controlled, and vacuum deaeration and secondary refining processes may need to be performed again.

On the other hand, in cases such as an example of the present invention where the molten steel obtained by refining the molten iron directly tapped from the iron making process is used, re-melting, deaeration, and secondary refining processes can be omitted, and thus the manufacturing cost can be reduced by shortening the process chain and it can be easier to remove impurities and to manufacture the high purity iron-based powder by using directly the molten steel subjected to the vacuum deaeration treatment.

Further, since the invention of the present application is not a technology using the scraps unlike the conventional art, the content of sulfur in the molten steel does not need to be adjusted within an appropriate range by adding the alloy iron including the sulfur component in a predetermined amount, and an additional temperature increasing process is not required in order to complement a temperature loss occurring in the course of putting the alloy iron.

Since the invention of the present application utilizes the molten iron including the sulfur component in a predetermined amount without performing re-melting of the scrap iron and an addition process of the alloy iron, the iron-based powder may be very economically manufactured as compared to the conventional art.

Although the present invention has been described in connection with the exemplary embodiments of the present invention, it will be apparent to those skilled in the art that various modifications and changes may be made thereto without departing from the scope and spirit of the invention.

Therefore, it is understood that the above exemplary embodiments are illustrative but are not limited. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing an iron-based powder, comprising:
    providing an iron-based molten steel manufactured through an iron making process and a steelmaking process to a tundish, wherein the steelmaking process comprises tapping molten iron from the iron making process and charging the molten iron into a converter to be refined; and
    water atomizing the molten steel discharged through a nozzle connected to the tundish.

2. The method of manufacturing iron-based powder of claim 1, wherein:
    a temperature range of the molten iron before being charged into the converter is 1,250° C. to 1,450° C., and a content of sulfur (S) is 0.005 wt % to 0.2 wt %.

3. The method of manufacturing iron-based powder of claim 1, further comprising:
    adding a sulfur-containing material to the molten steel so that a content of sulfur (S) included in the molten steel before being provided to the tundish is 0.1 wt % to 0.2 wt %.

4. The method of manufacturing iron-based powder of claim 1, wherein:
    in the molten steel refined by the steelmaking process, a content of carbon (C) is 0.001 wt % to 0.1 wt %, and a content of phosphorus (P) is 0.001 wt % to 0.02 wt %.

5. The method of manufacturing iron-based powder of claim 1, further comprising:
    performing dehydration, drying, and reduction heat treatment over the iron-based powder manufactured by the water atomization.

6. The method of manufacturing iron-based powder of claim 5, wherein:
    the reduction heat treatment is performed by reacting the iron-based powder, which is separated in liquid drops by the water atomization and cooled, under a reduction atmosphere of 600° C. to 1,200° C.

7. The method of manufacturing iron-based powder of claim 6, wherein:
    if an average content of sulfur (S) of the iron-based powder is more than 0.01 wt % after the reduction heat treatment, then repeating the reduction heat treatment.

* * * * *

UNITED STATES PATENT AND TRADEMARK OFFICE
CERTIFICATE OF CORRECTION

| | | |
|---|---|---|
| PATENT NO. | : 9,156,090 B2 | Page 1 of 1 |
| APPLICATION NO. | : 13/824192 | |
| DATED | : October 13, 2015 | |
| INVENTOR(S) | : Ha Neul Kim et al. | |

It is certified that error appears in the above-identified patent and that said Letters Patent is hereby corrected as shown below:

ON THE TITLE PAGE

Column 1, Item (75) Inventors, Line 2, delete "Kwan," and insert -- Kwon, --

IN THE CLAIMS

Column 11, Line 29, Claim 3, delete "0.2 wt %." and insert -- 0.1 wt %. --

Signed and Sealed this
Eighth Day of March, 2016

Michelle K. Lee
*Director of the United States Patent and Trademark Office*